(12) United States Patent
Matousek (10) Patent No.: US 10,045,488 B2
(45) Date of Patent: Aug. 14, 2018

(54) BONUS SIEVES AND TAILINGS RETURN FOR AN ARTICULATED AGRICULTURAL HARVESTING COMBINE

(71) Applicant: Tribine Industries LLC, Logansport, IN (US)

(72) Inventor: Robert A. Matousek, Valley Center, KS (US)

(73) Assignee: Tribine Industries LLC, Logansport, IN (US)

( * ) Notice: Subject to any disclaimer, the term of this patent is extended or adjusted under 35 U.S.C. 154(b) by 0 days.

(21) Appl. No.: 15/649,684

(22) Filed: Jul. 14, 2017

(65) Prior Publication Data
US 2018/0027739 A1    Feb. 1, 2018

Related U.S. Application Data

(60) Provisional application No. 62/369,307, filed on Aug. 1, 2016.

(51) Int. Cl.
*A01F 12/44* (2006.01)
*A01F 12/46* (2006.01)
*A01F 12/52* (2006.01)

(52) U.S. Cl.
CPC .......... *A01F 12/446* (2013.01); *A01F 12/444* (2013.01); *A01F 12/46* (2013.01); *A01F 12/52* (2013.01)

(58) Field of Classification Search
CPC .............. A01D 41/1276; A01D 61/008; A01D 75/282; A01D 41/1208; A01D 41/02; A01F 12/52; A01F 12/446
See application file for complete search history.

(56) References Cited

U.S. PATENT DOCUMENTS

| | | | | | |
|---|---|---|---|---|---|
| 4,305,407 | A | * | 12/1981 | De Coene | A01F 12/442 460/107 |
| 4,428,182 | A | * | 1/1984 | Allen | A01D 67/00 280/492 |
| 4,453,614 | A | * | 6/1984 | Allen | B62D 53/02 180/420 |
| 4,712,568 | A | * | 12/1987 | Strong | A01F 12/448 209/394 |
| 6,012,272 | A | * | 1/2000 | Dillon | A01D 41/02 460/114 |

(Continued)

FOREIGN PATENT DOCUMENTS

JP     2004065247 A  *  3/2004  ............. A01F 12/32

*Primary Examiner* — Arpad Fabian-Kovacs
(74) *Attorney, Agent, or Firm* — Mueller Law, LLC; Jerry K. Mueller, Jr.

(57) ABSTRACT

Disclosed is an articulated harvesting combine of a forward power processing unit (PPU) having a forward set of wheel assemblies and a rear grain cart connected by an articulating joint assembly. Bonus sieves assemblies are located in the outer rear of the PPU for accepting grain from concaves and grates assemblies located forward of the bonus sieves assemblies. The bonus sieves assemblies accept tailings from the concaves and grates assemblies for additional separation of grain from material other than grain (MOG). New and separate airflow is provided for the bonus sieves. The bonus sieves tailings are returned to the bonus sieves for rethreshing, optionally after being particulated and air separation performed.

8 Claims, 12 Drawing Sheets

(56) References Cited

U.S. PATENT DOCUMENTS

| | | | | |
|---|---|---|---|---|
| 6,339,917 B1* | 1/2002 | Dillon | ............... | A01D 41/02 |
| | | | | 460/114 |
| 6,579,172 B2* | 6/2003 | Lauer | ............ | A01D 41/1276 |
| | | | | 460/1 |
| 6,632,135 B2* | 10/2003 | Matousek | ......... | A01D 41/1208 |
| | | | | 460/114 |
| 6,632,136 B2* | 10/2003 | Anderson | ........... | A01F 12/448 |
| | | | | 460/101 |
| 7,297,052 B2* | 11/2007 | Maertens | ........... | A01D 41/1276 |
| | | | | 460/101 |
| 7,717,778 B2* | 5/2010 | Redekop | ............. | A01F 11/06 |
| | | | | 460/101 |
| 9,011,222 B2* | 4/2015 | Johnson | ........... | A01D 41/127 |
| | | | | 460/1 |
| 2007/0298852 A1* | 12/2007 | Dillon | ............. | A01D 41/1208 |
| | | | | 460/119 |
| 2009/0111545 A1* | 4/2009 | Pope | ................. | A01F 12/52 |
| | | | | 460/14 |
| 2009/0151313 A1* | 6/2009 | Dillon | ............. | A01D 41/1208 |
| | | | | 56/14.6 |
| 2010/0113113 A1* | 5/2010 | Ricketts | ............. | A01F 12/448 |
| | | | | 460/101 |
| 2016/0192591 A1* | 7/2016 | Missotten | ........... | A01F 12/444 |
| | | | | 460/100 |
| 2017/0142901 A1* | 5/2017 | Herrman | ........... | A01D 41/1208 |

* cited by examiner

BONUS SIEVES AND TAILINGS RETURN FOR AN ARTICULATED AGRICULTURAL HARVESTING COMBINE

CROSS-REFERENCE TO RELATED APPLICATIONS

This application claims benefit of provisional application 62/369,307 filed Aug. 1, 2016; is cross-referenced to application Ser. No. 14/946,827 filed Nov. 20, 2015; Ser. No. 14/946,842 filed Nov. 20, 2015; Ser. No. 14/967,691 filed Dec. 14, 2015; 62/235,618 filed Jul. 6, 2016; Ser. No. 15/623,619 filed Jun. 15, 2017; and Ser. No. 15/642,799 filed Jul. 6, 2017.

STATEMENT REGARDING FEDERALLY SPONSORED RESEARCH AND DEVELOPMENT

Not applicable.

BACKGROUND OF THE INVENTION

The present disclosure relates to harvesting articulated (jointed) combines and more particularly to an articulated combine design that permits additional sieve capacity concomitant with tailings return thereto.

Typical to the architecture of traditional combines are cleaning sieves that are located to the rear of and beneath the threshing mechanisms of the combine harvester. This routinely results in the sieves being located between both and/or one of the two sets of tires typical to these machines—large front tires and smaller rear steering tires. As such, the width of the sieves is regulated by the distance between these respective sets of tires and especially the smaller rear steering tires. In the case of the large front tires, they have a fixed orientation relative to the length of the machine, and generally are held fast, parallel to the chassis containing the threshing and cleaning mechanisms.

However, in the case of the rear steering tires, they effect the steering by rotating around their (more or less) vertical king pin, and in so doing move considerably inwardly toward the side of the machine either in their front or their rear depending on the direction of steering. This inward movement of the steered tires necessitates a corresponding reduction in the width of the separator to allow tire clearance. And, then, as the rear axle oscillates around its central pivot pin allowing the tires to move up and down literally feet in distance, the tires move inwardly even more. All of this describes why the width of sieves in a typical combine often are reduced to a width that is much less than adequate for the given capacity of a high horsepower modern combine resulting in lower than desired cleaning system capacity of the machine. It is literally not feasible to raise the sieves high enough to accommodate the axle oscillation if one desires to make the sieves wider near the rear of the machine.

Therefore, it is nearly mandated that if a manufacturer wishes to add addition sieve area, he cannot do it by adding sieve width, which is quite effective, but instead must choose to keep the sieves the same width and just make them longer, which is much less effective.

Combine designers realized at the outset that they needed to recover unthreshed material as it exited from the rear of the sieves and return it to the threshing mechanism for rethreshing to separate additional grain from the MOG. This was an acceptable practice when harvesting combine machines were small and rotary threshing capacity was not challenged.

As combine horsepower and capacities have increased over time, the industry has learned not to return the tailings to the front of the rotor for reprocessing, and has instead learned to reprocess the tailings near the rear of the separator and return them to the upper sieve for recovery of the grain. The crux of this issue is explained as follows: if the rotor is running very near its maximum capacity to thresh and separate the volume of material the feeder is providing, then the rotor cannot effectively address separating at the increased rate that recycling tailings would require. That is, the best that the rotor can do is to recover grain without tailings return. With an increased burden caused by tailings recycle, the rotor necessarily is beyond its maximum capacity and the percentage of grain recovered diminishes. That means that the amount of tailings to recycle will increase. This is a spiraling diminution in grain recovery. Thus, a different approach to the issue of tailings recycle is required.

Fortuitously, inherent in the design of articulated combines is the ability to provide a second grain cleaning station (so-called "bonus sieves" herein), which can additionally address and solve the tailings recycle issue.

BRIEF SUMMARY OF THE INVENTION

Disclosed is an articulated harvesting combine of a forward power processing unit (PPU) having a forward set of wheel assemblies and a rear grain cart connected by an articulating joint assembly. Bonus sieves assemblies are located in the outer rear of the PPU for accepting grain from concaves and grates assemblies located forward of the bonus sieves assemblies. The bonus sieves assemblies accept tailings from the concaves and grates assemblies for additional separation of grain from material other than grain (MOG). New and separate airflow is provided for the bonus sieves. The bonus sieves tailings are returned to the bonus sieves for rethreshing, optionally after being particulated and air separation performed.

Disclosed also is an improved sieve type cleaning system with increased functional area from its primary area commencing between the forward tires of the harvester to a wider width for the region behind said tires, continuing to near or beyond the effective rear of the separation and cleaning area of the harvester being the harvester traditional or articulated. The extra threshing assemblies are structurally suspended for the wider sieve sections from the support structures of the major sieves in a manner that does not require these extra threshing sieves to be driven separately from the major sieves. Both upper and lower bonus sieves could be "co-shaken" versus the opposing shake of the major sieves assemblies. Alternatively, the bonus sieves could be shaken in opposition to each other and the major sieves, given proper structural allowances. The bonus sieve arrangement could be chosen to use only one layer of sieve, be it the bottom or top sieve only when suitable crop performance can be reached.

Dedicated fan assemblies are located apart from the major cleaning fan that are solely dedicated to providing air volume for the winnowing functions of the (wider) extended rear sections of sieves. Bonus sieves could conceivably be driven by air from the primary fan, given proper ducting and given recognition of the extra air volume that the primary fan would have to provide.

The return of the tailings material via the dual return elevators to the front of the bonus sections of the sieve component, and introduced in such a manner as to have a portion of the air from the bonus fans being used to remove lighter MOG from the material stream such that it does not fall onto the surface of the sieve(s). The tailings material could be discharged into the airflow such that such tailings are splayed out into the air stream for a particulate material flow and are thusly particulately separated such that the air can act upon each particle of grain or MOG independently. The splaying of the tailings material could be assisted by velocity imparted by centrifugal force from the return elevator assembly and centrifugal force.

The location of the bonus sieves (not necessarily) adjacent to (directly beside while below) the separation area (commonly "separation grates") of a rotary separator so as to significantly increase the relative area of cleaning sieve in the section of the separator where increased MOG versus grain ratio can be expected, and as such prevent the unfortunate introduction of excess MOG onto the stratified flow in existence on the main sieves in this rearward section of the cleaning system.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF THE INVENTION

First and foremost, the articulation architecture of the disclosed harvesting combine permits the power processing (front) unit (PPU) to contain much wider sieves starting at the front of the machine, because the separator frames are wider inasmuch as no rear steering tires/wheels are necessary. This articulation architecture also allows the wider sieves to remain lower in the separator and still be below the threshing rotor. And equally as fortuitous for the sieve area is that, since there is no oscillating rear axle within the area of the separator, the sieves can be configured to be much wider once they progress rearward of the large front tires.

Digging into the science of sieve operation, the sieves are asked to accept the grain as well as the Material Other than Grain (MOG) that is expelled by the rotor through the concaves and grates that are located directly above the sieves. The ability of the oscillating sieves and the air being pushed up through the sieves to suspend and remove the MOG from the grain is inversely and exponentially related to the quantity of MOG that is being introduced into the system versus the amount of grain introduced based on the measured thickness of the mat of material that is deposited onto the upper sieve. Concurrently, the difficulty of the mission is increased as the percentage of MOG to grain is increased, even to the point of "collapsing" the suspension of the mat by the cleaning fan. Resultant from this action is that grain will be entrained with the MOG and moved off the rear of the sieves, which is an undesirable result to be avoided.

In a typical harvesting combine, this grain and MOG is mixed and transported to the front of the sieves to allow a longer distance for the cleaning system to try and deal therewith. Alternatively, the grain rich mat at the front of the sieves becomes confused by the MOG rich material, if it is allowed to fall onto the sieves at the back of the rotor. In either case, the rear section of the sieves sees such a high MOG to grain ratio that it struggles to accomplish its task in a timely fashion and grain loss off the back of the separation system occurs.

Since the disclosed harvesting combine chooses to widen the sieves at the exact point that the separating grates begin where (by definition of threshing and separating principles) the MOG to grain ratio of material being deposited increases precipitously, it is providing increasing sieve area to deal with increasing sieve MOG loading. By so doing, the configuration avoids very heavy loading of the original width of sieves that still carries grain (mostly stratified by the sieving and winnowing nearer the front of the main sieves) and does not need high MOG confusing the situation.

However, a major contributor to the winnowing of the MOG from the grain is the activity of the air stream from the cleaning fan that serves to lift the MOG away from the heavier grain and transport it rearward to be dispatched out the rear of the machine as desired. With the widening of the width of the sieves, it is impractical to expect the air traveling down the middle section of the sieve to magically widen out abruptly and start also flowing up through the novel disclosed bonus sieves. Instead, centrifugal style, narrow fans are located near the front of the widened chassis sections, directly under and in front of the widened area referred to as bonus sieves. These fans provide additional airflow to aid in the winnowing of the MOG from the grain on the bonus sieves.

Structural and Power Transfer Considerations

As one increases the length side-to-side of the sieves at the rear of the separator, one increases exponentially the stresses that will be felt by the severely oscillating members of the sieves and supporting rails in an environment often expected to approach up to 3G accelerations. Keeping in mind that weight must be kept to a minimum in order to be able to shake the sieves that aggressively. For these reasons, and other reasons of space concerns, the bonus sieves are attached to the upper sieve rails, and both top and bottom bonus sieves are shaken by the motion of the top main sieve. The contrast is that the main sieves have opposing shake pattern, in that as the top one moves forward, the bottom one moves rearward, a situation common to the combine function for reasons not needed in this discussion.

With this configuration and shake motion, we have chosen to attach the bonus sieves to the upper sieve rails where the motion is more aggressive. To accommodate the added weight of the bonus structures, we also suspend the upper sieve with three hangers, as opposed to the customary two. All of these hangers attach to the main sieve rails, which results in the bonus sieves being cantilevered off the sides of the rear of the rails. The bonus sieves are placed one above the other, with a short grain pan under the front of the lower sieve on each side to deliver grain to the clean grain cross auger. The sieves are identical in geometry to allow universal fitting top versus bottom.

An important feature structurally is the cantilevered tubular section that extends from the sidewall (where the wall turns outward to allow the bonus area) rearward to a point significantly rearward of its attachment to the wall. This allows the structure to extend out over the sieves far enough to allow the rear hanger to be more near the rear of the rails for better oscillation support. Quite importantly, the top surface of the decreasing shape of the tube structure is descending significantly downward such that longer stringing material discharged by the rotor will be induced to move rearward on its top surface to prevent this protrusion from becoming a location of residue plugging by hair-pinning on top.

In the case of both upper and lower sieves and rails, the force used for oscillation of the sieves will be applied to the main rails of the sieves, and not at the outside of the bonus sieve rails. This avoids trying to transmit the oscillation forces through the outside bonus rails, and then around the sharp corners of the front of the bonus area, into the main rails. Such attempts to make the structure robust to the fully reversing oscillation drives would prove futile, or at best very heavy and costly. It should be appreciated, however, that additional modes of implementing the precepts disclosed herein will be readily apparent to the skilled artisan based on the present disclosure.

Tailings Return

The disclosed design will accomplish the return-to-sieve function in a different manner than is currently practiced. We will gather the material at the rear of the lower sieve as typical in an auger trough, and as less typically transfer the material to both sides of the separator. At the outer wall of the separator, and between the double walls unique to the disclosed design in this area, a typical roller chain with paddles will move the material up between the walls on a slide that will deliver it to the front of the bonus sieves. These paddles will be backswept in attitude such that they will roll the material while dragging it up the slope to cause a threshing action against the slide, which also can be made to be rough and abrasive to the material. Additionally, the flights of the tailings augers will be backward sloped in their spiral to also cause pinching and rolling of the grain against the wall of the auger trough.

As the material is introduced at the top of the miniature elevators, it will be slung outward by centrifugal force as the chain paddle travels around the upper sprocket. The wall of the upper cavity is sloped to deflect the material inward toward the sieve surfaces. It then will be hit by a blast of air from the bonus fans that will effect a pneumatic pre-cleaning of the MOG from the heavier grain that will propel the MOG out the rear of the separation chamber, while the heavier grain is less effected and will fall to the sieves for separation and cleaning.

Figure 1:
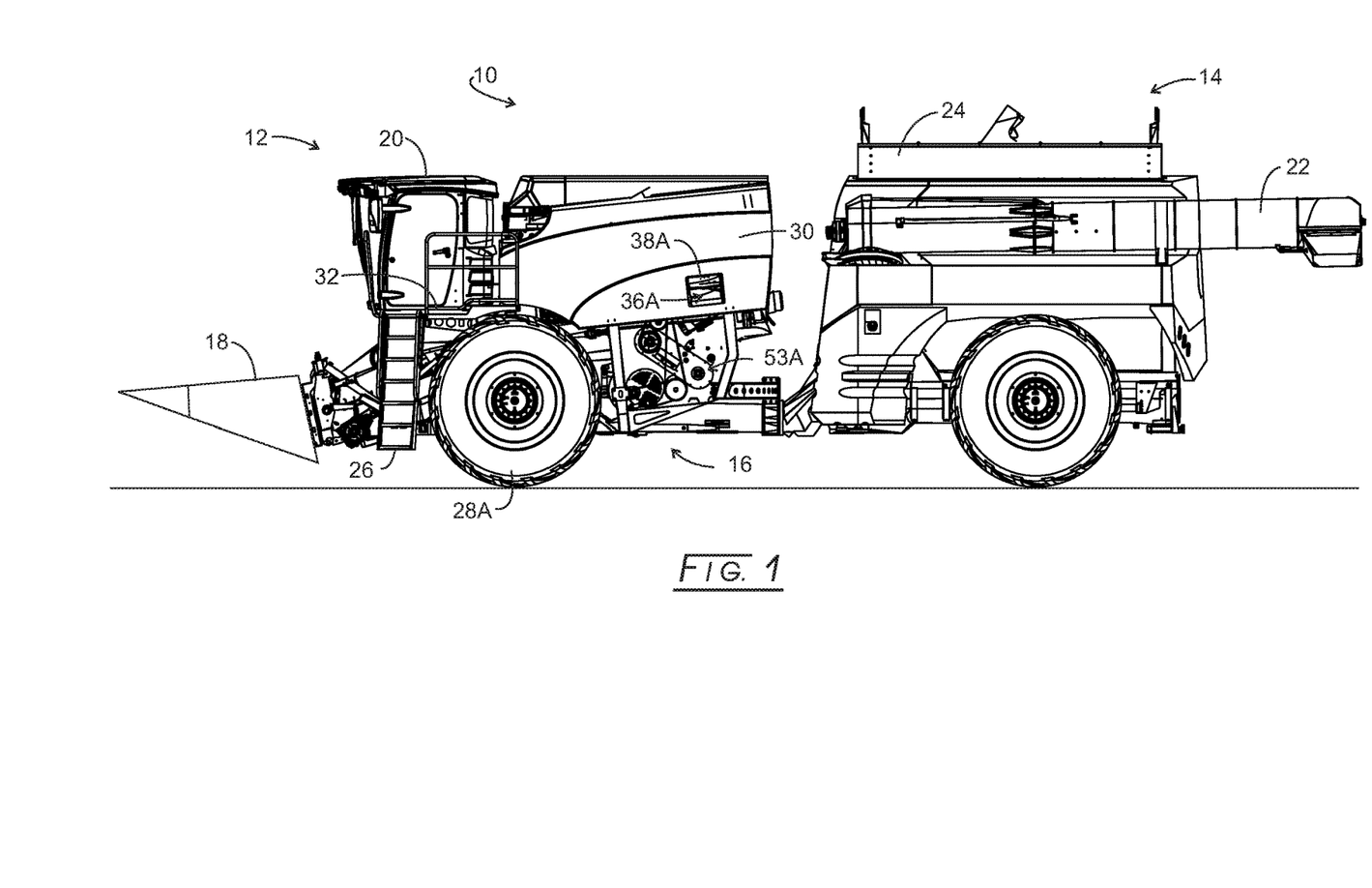
FIG. 1 is a side view of the articulated harvesting combine fitted with the bonus sieves assembly disclosed herein.
Figure 2:
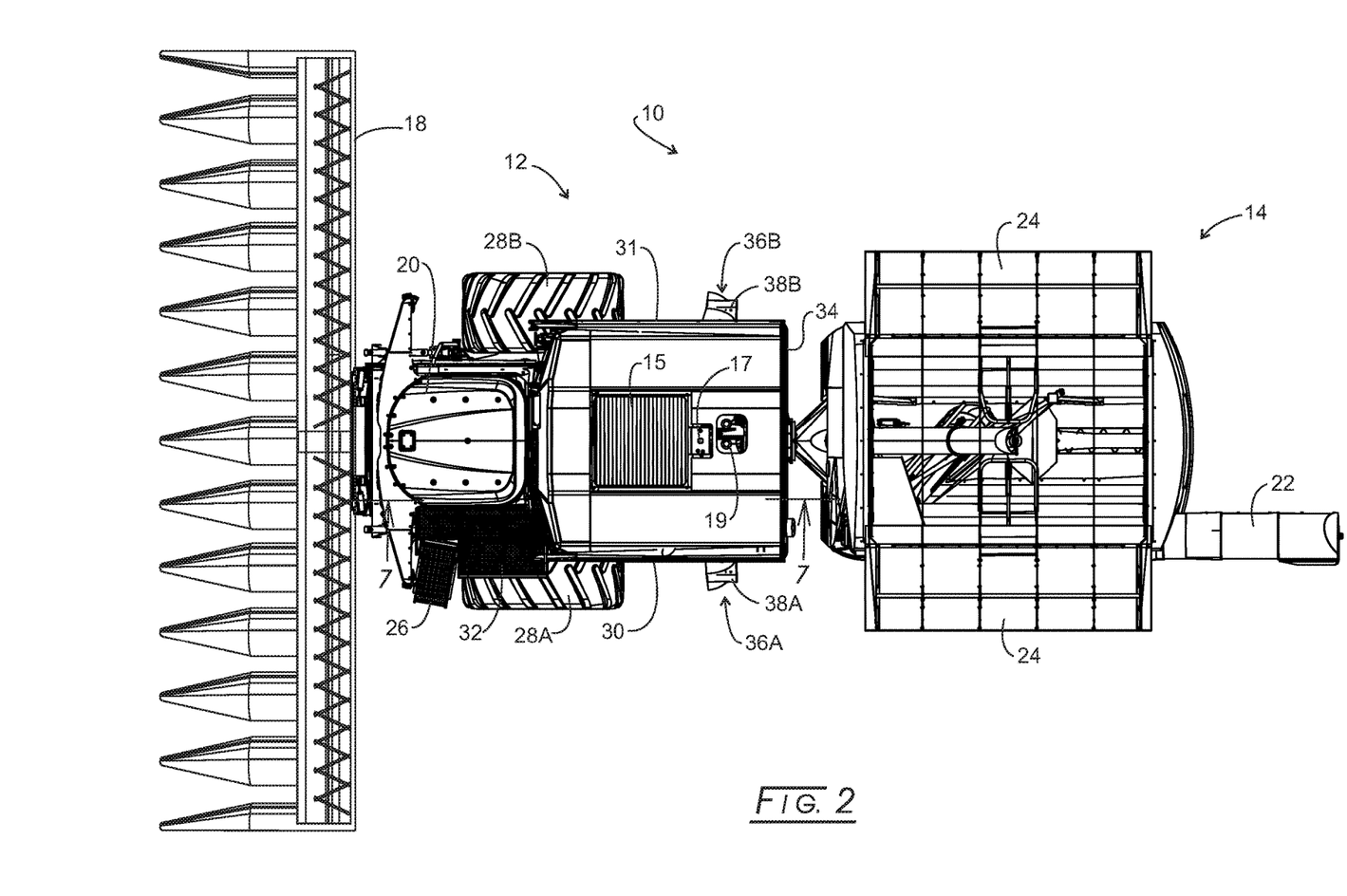
FIG. 2 is a top view of the articulated harvesting combine of FIG. 1.
Figure 3:
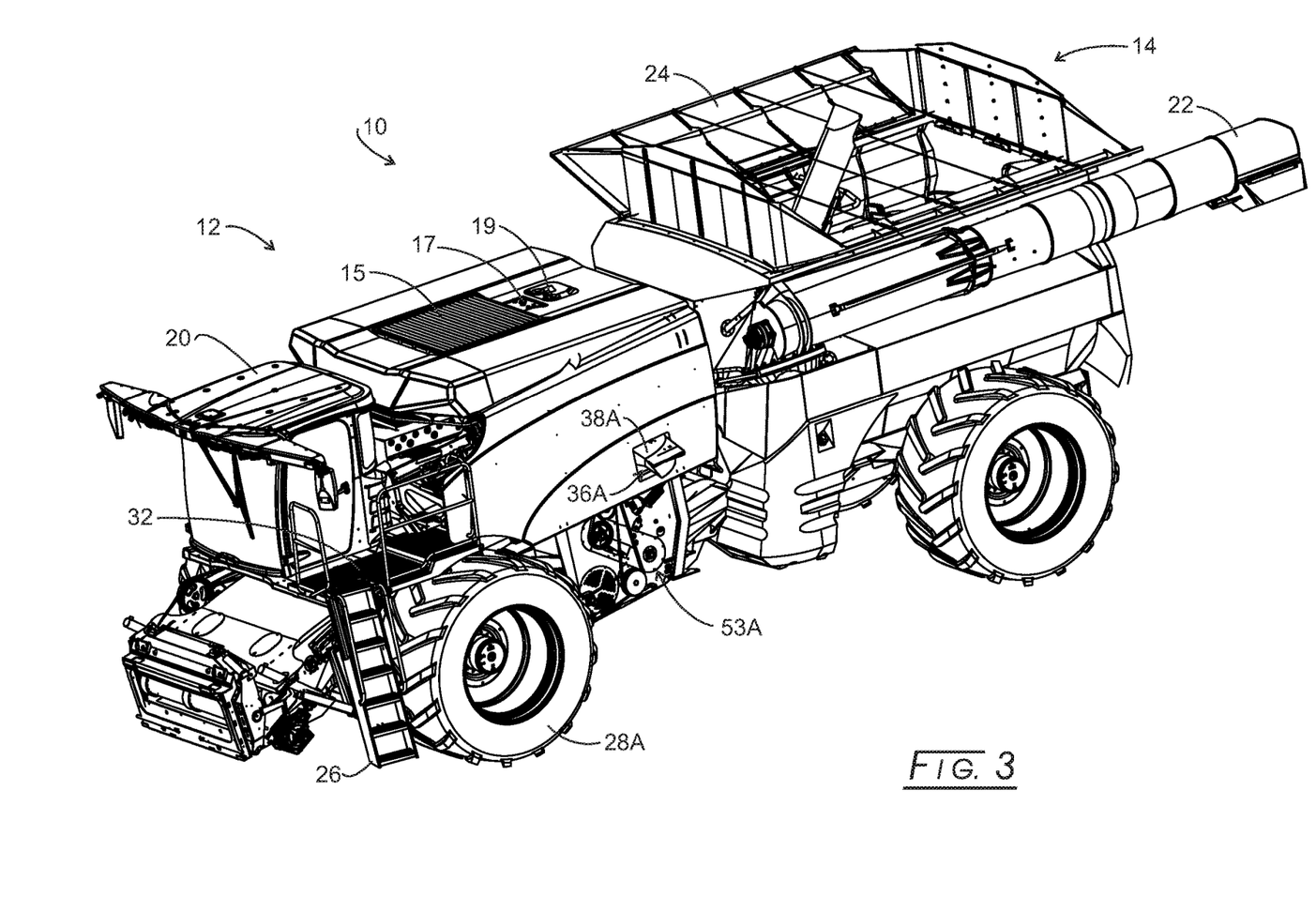
FIG. 3 is an isometric view of the left side of the articulated harvesting combine of FIG. 1.

Referring now to the drawings and specifically referring initially to FIGS. 1, 2, and 3, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10. A radiator cap, 17, and engine exhaust, 19, are located behind screened air inlet 15.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015.

Figure 4:
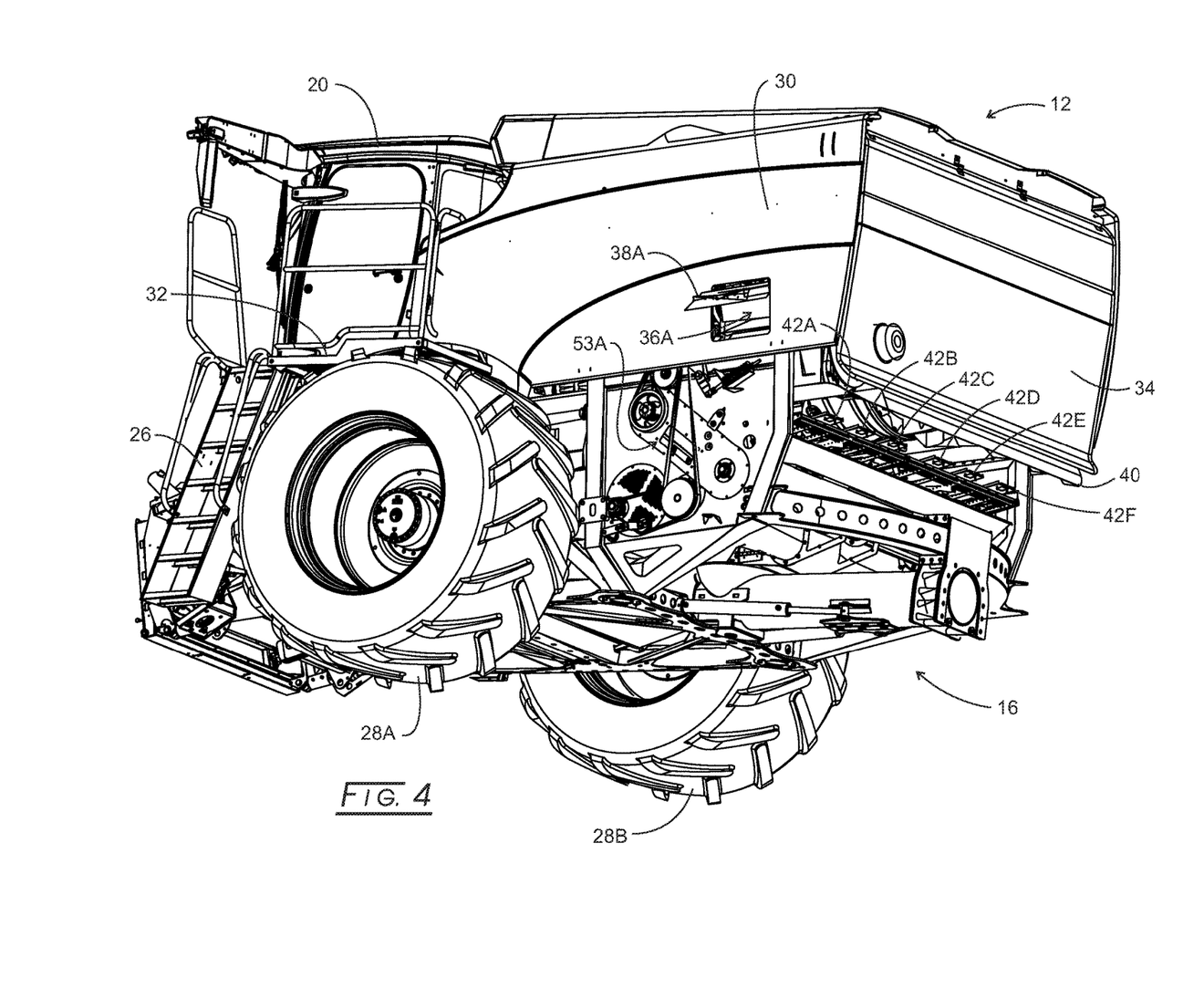
FIG. 4 is a bottom isometric view of the left rear end of the forward unit of the articulated harvesting combine of FIG. 1 showing a portion of the disclosed bonus sieves assembly disclosed herein.

Referring now to FIGS. 3 and 4, the operator is granted access to cab 20 by a stair assembly, 26, that extends upwardly from just above the ground and will be more fully disclosed in commonly owned application Ser. No. 15/654,786, filed Jul. 20, 2017 (62/375,986 filed Aug. 17, 2016). PPU 12 is supported by wheel assemblies, 28A and 28B (FIG. 2). A movable side panel, 30, grants access to the operator or mechanic to the internal mechanisms housed with in PPU 12 from stair assembly 26 and a platform, 32, and retains a foldable platform movable from a vertical home position while the panels are in place to a horizontal active position when the panels are moved away. Such foldable platform mates with platform 32. The movable side panel is more particularly disclosed in commonly owned application Ser. No. 15/662,332, filed Jul. 28, 2017 (62/376,512 filed Aug. 18, 2016).

In FIG. 4, a rear panel, 34, covers the back of PPU 12. Panels 30, 31 (see FIG. 5), and 34 only extend downwardly to cover about one-half of the height of PPU 12, allowing access to the exposed internal components for repairs, maintenance, and like occasions. Towards the rear of both panels 30 and 31 are MOG outlets, 36A and 36B, respectively, having top deflector plates, 38A and 38B, respectively. These deflector plates are adjustable for determining the location for depositing MOG expelled from the disclosed bonus sieves assemblies. MOG discharged from the rear of PPU 12 strikes a deflector, 40 (see also FIG. 6), to direct the MOG downwardly and not at grain cart 14. Six extensions, 42A-42F, terminated by sensors, 44A-44F (see also FIG. 8), respectively, are located just before hood 40 and provide additional data to the operator.

Figure 6:
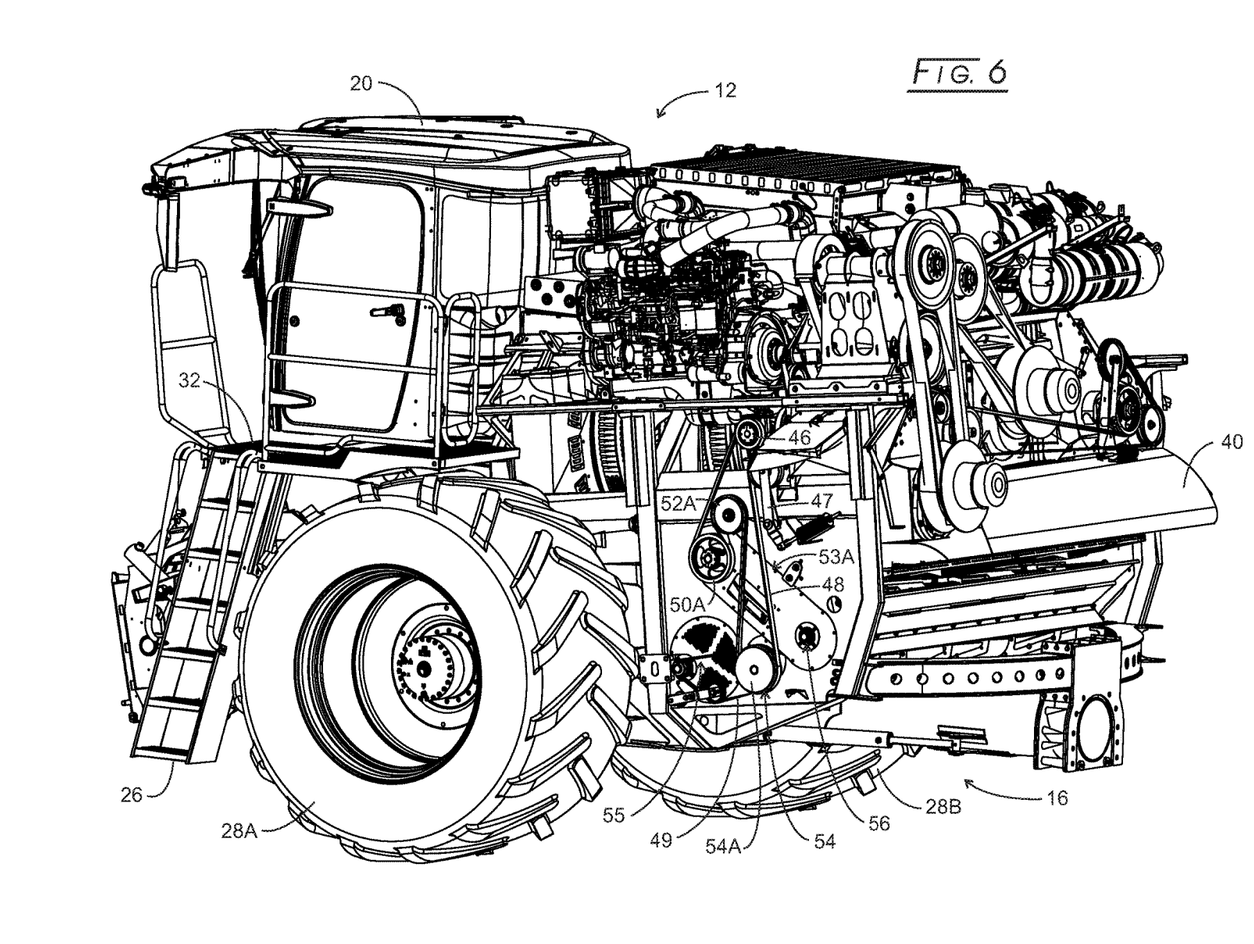
FIG. 6 is an isometric view of the left side of the forward unit of the articulated harvesting combine of FIG. 1 with the outer coverings or skins removed.

Referring now additionally to FIG. 6 where the top, rear, and side fascias have been removed, a gearbox and drive assembly for the bonus sieves, 46, is located on left side of PPU 12. A belt, 48, transfers the power from drive assembly 46 in a counter-clockwise direction around bonus sieves drive shaft pulley, 50A (for bonus sieves feed conveyor assemblies 53A and 53B) an idler pulley, 52A, a grain auger drive assembly pulley, 54, and back to drive assembly 46 around tensioner 47. Another belt, 49A, runs from pulley assembly 54A (for grain auger drive assembly 54) to a fan assembly, 55, supplying airflow to the bonus sieves assemblies.

Figure 5:
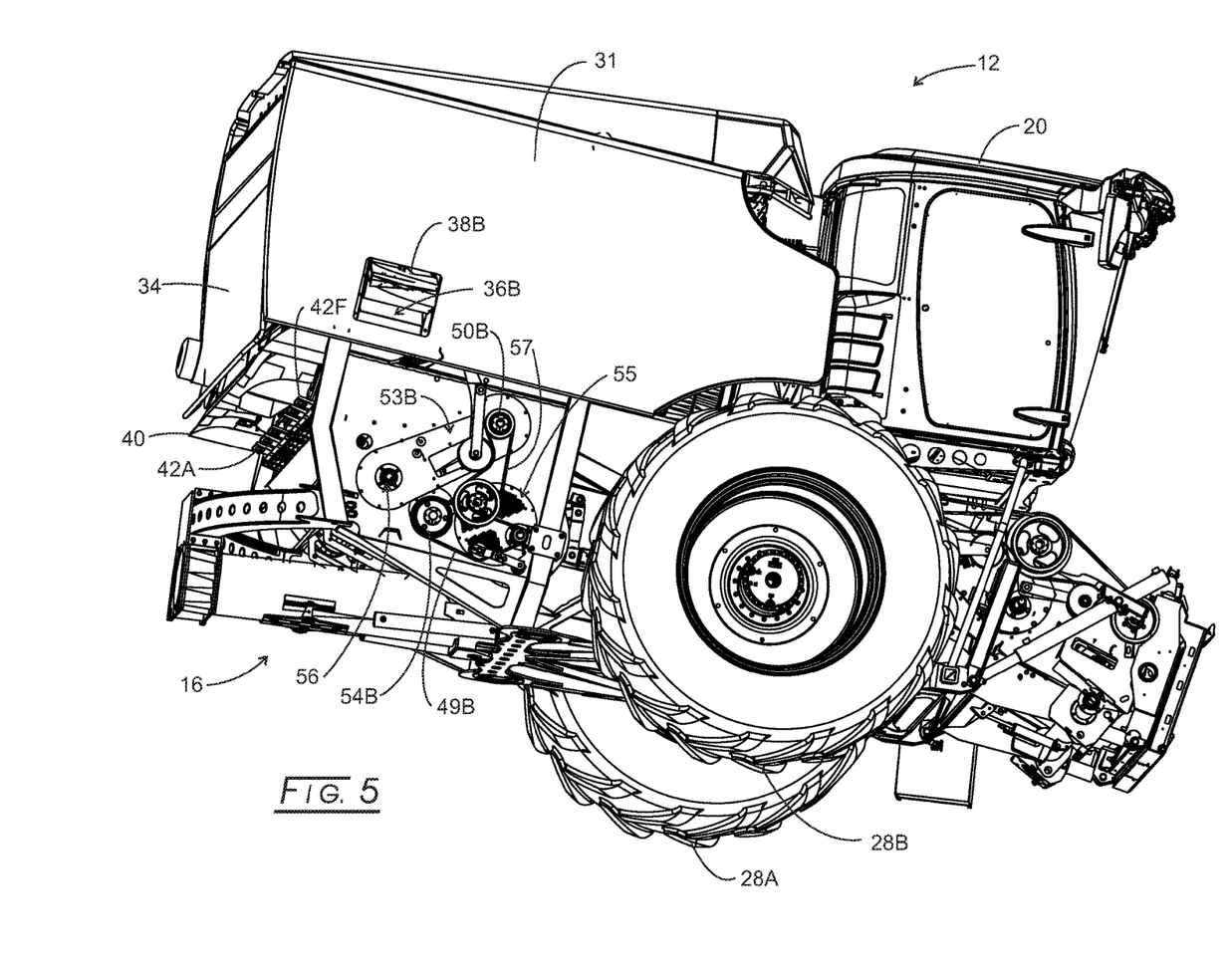
FIG. 5 is an isometric view of the right rear end of the forward unit of the articulated harvesting combine of FIG. 1 from underneath showing a portion of the disclosed bonus sieves assembly disclosed herein.

Referring to FIG. 5, bonus sieves drive pulley 50A is connected to a shaft, 78 (see FIG. 11), to a bonus sieves drive pulley, 50B on the right side of PPU 12. A conveyor/auger assembly, 56, has flights that pull tailings from the center to both the right side and to the left side of PPU 12 for delivering tailings outwardly into bonus sieves conveyer assemblies 53A and 53B. A grain auger drive assembly 54 connects pulley assembly 54A on the left side to a pulley assembly, 54B, on the right side on PPU 12. Belts, 57 and 49B, connect the various pulley assemblies on the right side of PPU 12, as shown in FIG. 5.

Figure 7:
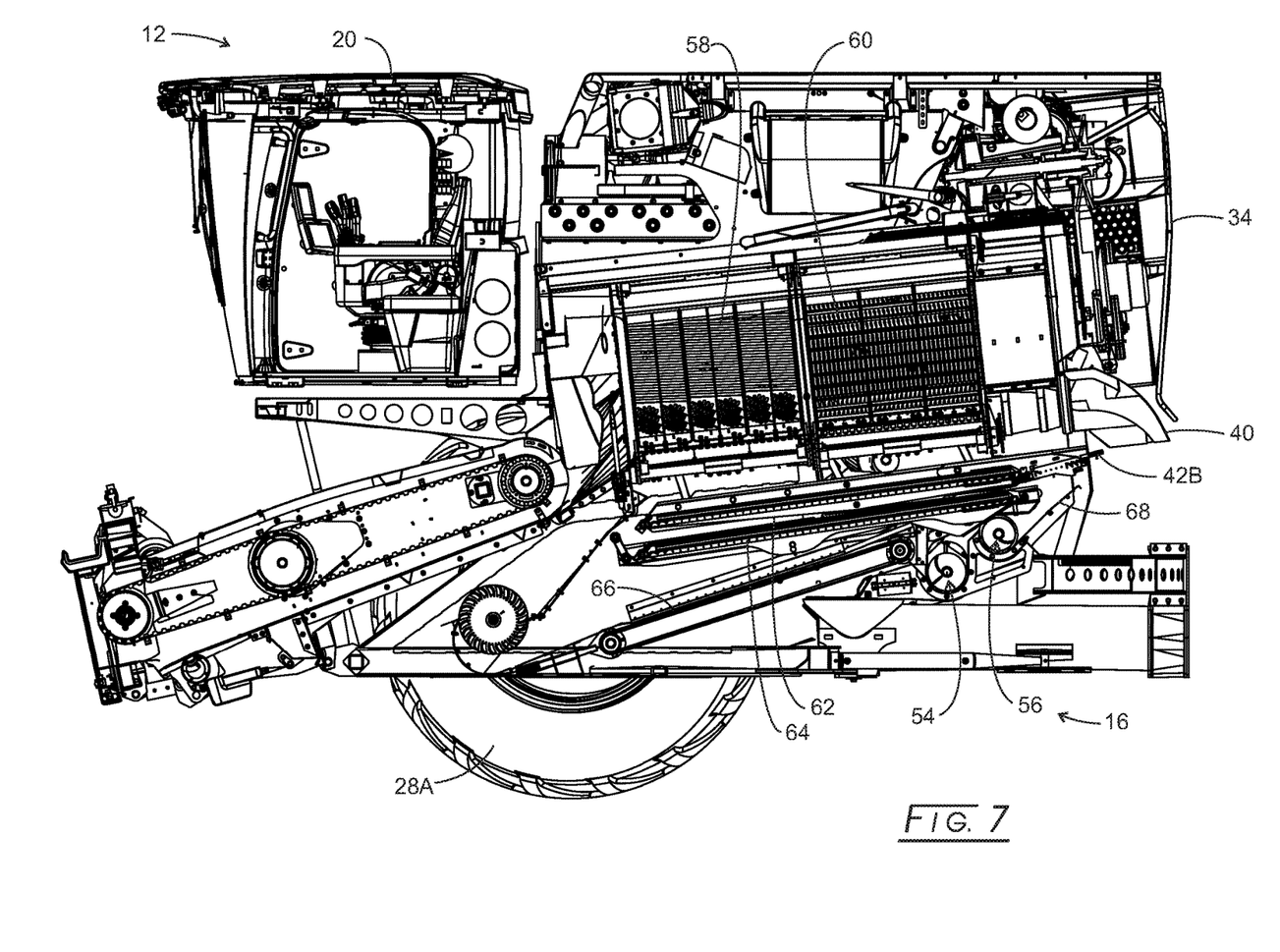
FIG. 7 is a sectional view taken along line 7-7 of FIG. 2.

In FIG. 7, concaves, 58, and grates, 60, are seen housed within PPU 12. Below the concaves and grates are a pair of stacked, shaken sieves assemblies, 62 and 64, where an air fluidized, grain-rich mat, is shaken with heavier grain falling downwardly and lighter MOG carried away by the fluidizing air flow, all in conventional fashion. The heavier grain falls down through the two sieves assemblies down onto a conveyor, 66, for movement rearwardly and downwardly to be transferred to rear grain cart 14. A wall, 68, catches heavier tailing material that is blown from the sieves assemblies and directs the heavier tailings down to the tailing auger assembly 56. The remaining MOG is blown out the rear of PPU 12 and directed downwardly by hood 40.

Figure 8:
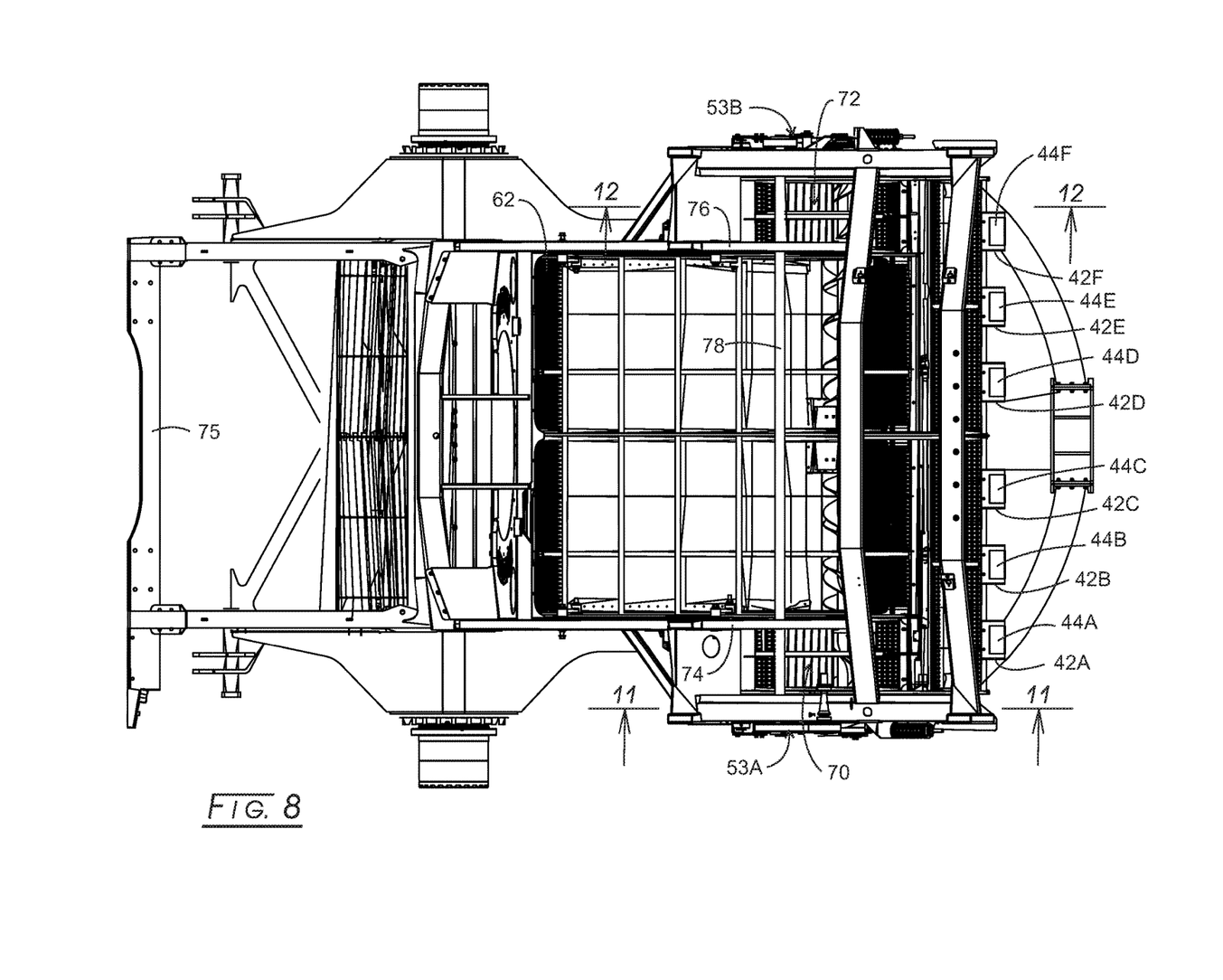
FIG. 8 is a top view of the forward unit of the articulated harvesting combine of FIG. 1 with its internal components removed but for the sieves and bonus sieves assemblies.
Figure 9:
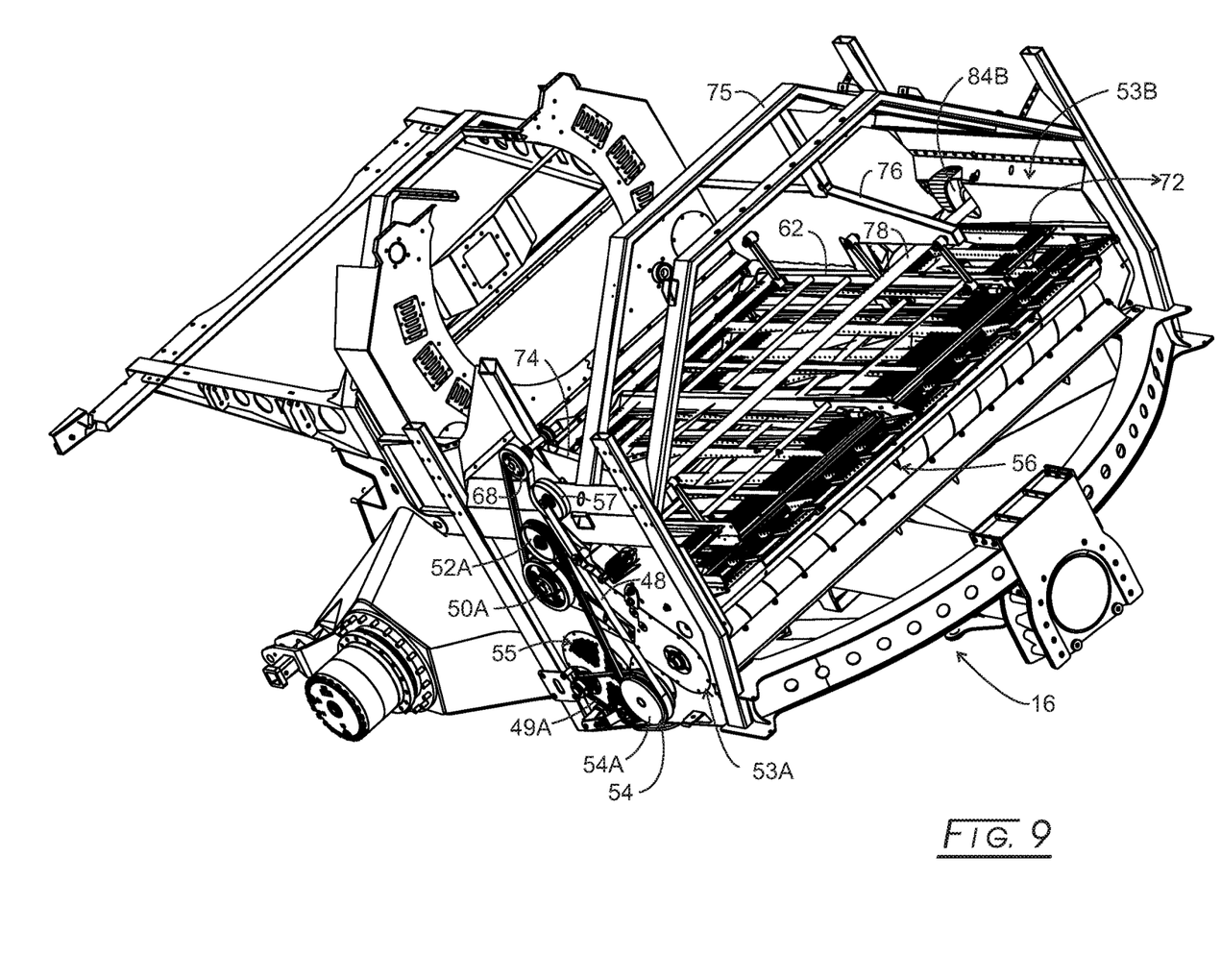
FIG. 9 is a right side isometric view of the forward unit of the articulated harvesting combine of FIG. 1 with its internal components removed but for the sieves and bonus sieves assemblies.
Figure 10:
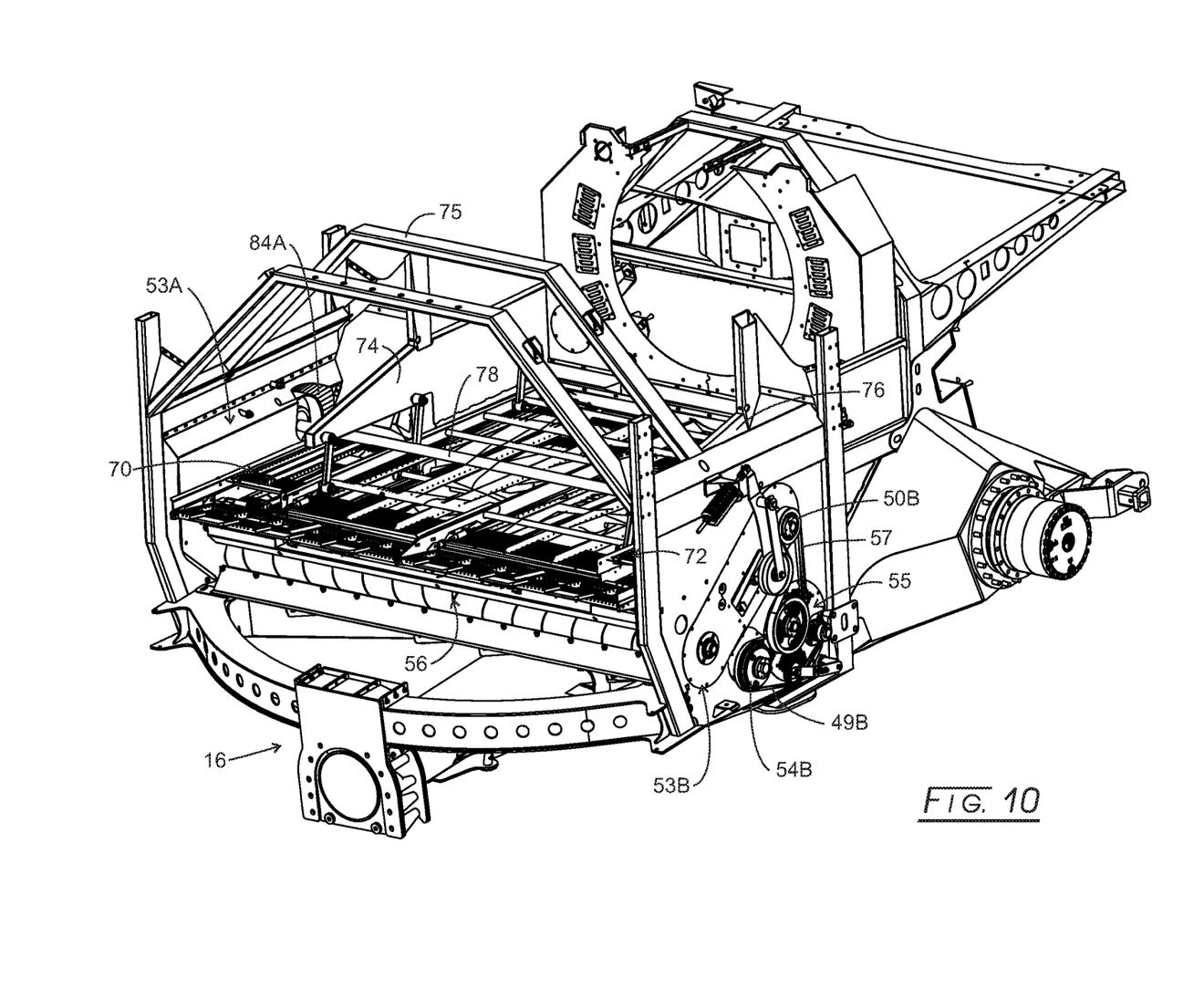
FIG. 10 is a left side isometric view of the forward unit of the articulated harvesting combine of FIG. 1 with its internal components removed but for the sieves and bonus sieves assemblies.

Bonus sieves assemblies, 70 and 72, can be seen in FIG. 8 and are hung rails, 74 and 76, which also support upper sieves assembly 62 resulting in bonus sieves assemblies 70 and 72 being oscillated or shaken in concert with upper sieves assembly 62. The extra width of PPU 12 will be appreciated in FIG. 8 and, as stated above, results from the absence of rear (steering) wheels for PPU 12 by virtue of the articulated design. Bonus sieves assemblies 70 and 72 being also are seen in FIGS. 9 and 10, respectively, along with frame assembly, 75. In FIG. 8 and other figures, much of the bonus sieves have not been completely shown to be sieves so as to not have too much blackened area. The ends of the sieves typically are shown as "sieves", however.

Figure 11:
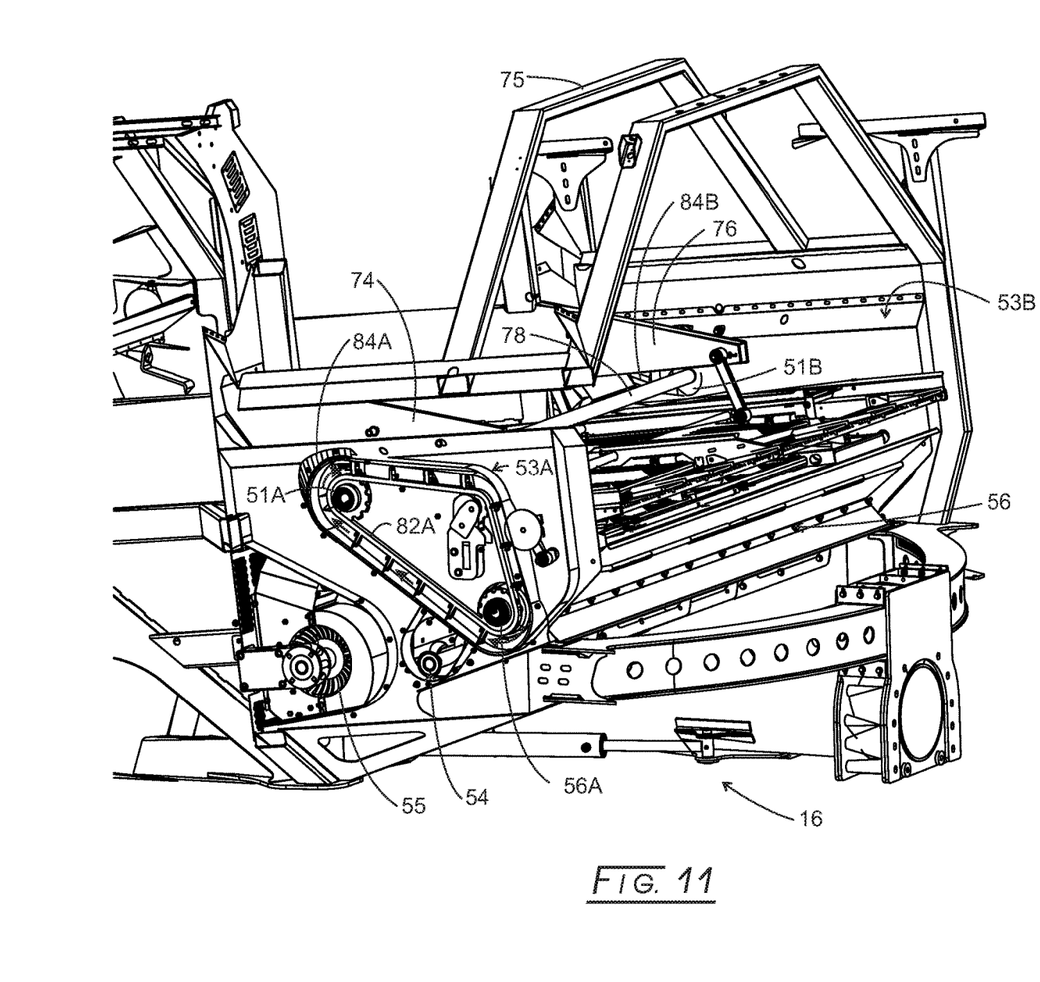
FIG. 11 is a section view taken along line 11-11 of FIG. 8.
Figure 12:
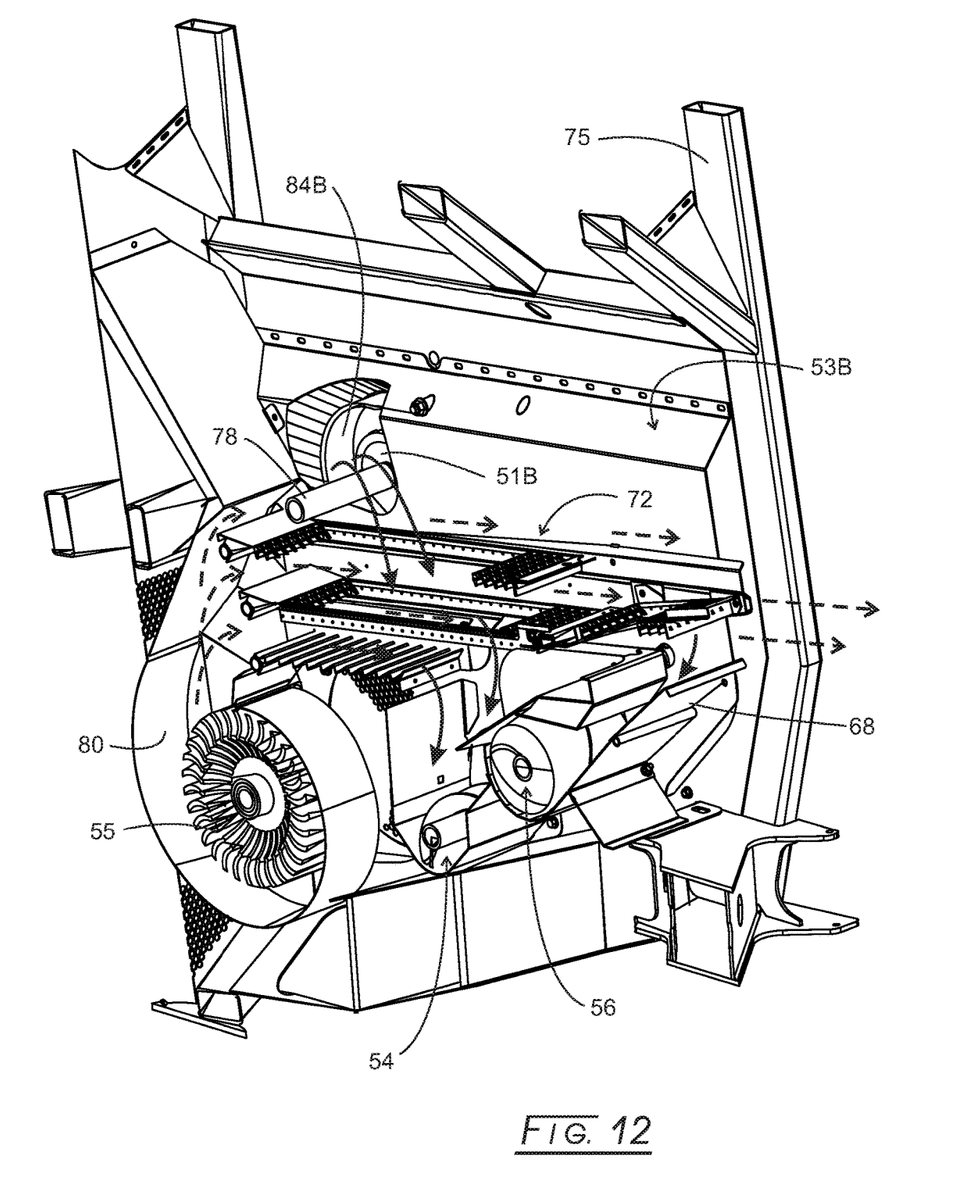
FIG. 12 is a section view taken along line 12-12 of FIG. 8.

FIG. 11 reveals conveyor assemblies 53A and 53B for the bonus sieves assemblies 70 and 72, including, inter alia, bonus sieves drive pulleys 50A and 50B connected to shaft 78. Conveyor assembly drive sprockets 51A and 51B also connect to shaft 78. FIG. 11 also reveals fan assembly 55, tailing auger assembly 56, and grain auger drive assembly 54. Grain auger assembly 56 is driven by sprockets, 56A and 56B. The return tailings are fed to the bonus sieves conveyors 53A and 53B by tailing auger assembly 56 through openings next to sprockets 56A and 56B. The tailings then are conveyed upwardly by conveyor chain paddle assemblies, 82A and 82B, to openings, 84A and 84B, (not shown) behind sprockets 51A and 51B. These openings 84A and 84B are shaped so that the tailings are directed onto bonus sieves 70 and 72. Fan assembly 55 is revealed in further detail in FIG. 12. It will be seen to include a curvilinear director assembly, 80, that directs an airflow (dotted arrows being airflow in FIG. 12, while solid arrows shows material flow) towards the bonus sieves assemblies for removal of lighter MOG material while letting heavier grain fall down through the bonus sieves 70 and 72 and into auger assembly 54. It will be observed that material (tailings from concaves 58 and grates 60) from grain auger drive conveyor assemblies 53A and 53B moves downwardly onto bonus sieves assembly 72 for additional grain recovery with separated grain falling into auger assembly 54.

It will be apparent to the skilled artisan that conventional harvesting combines can be modified in accordance with the precepts of the articulated harvester bonus sieves disclosed herein. That is, the rear steering wheels can be moved backwardly a sufficient distance to provide the necessary extra space for adding bonus sieves to a conventional harvesting combine at the expense of extending the length of the combine to create a very long and unwieldy combine in terms of its length and weight with necessary steering issues. Still, that is the modification to a conventional combine required to mimic the disclosed articulated harvesting combine with bonus sieves capacity.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. In an articulated harvesting combine of a forward power processing unit (PPU) having a forward set of wheel assemblies and a rear grain cart connected by an articulating joint assembly, where the PPU carries concaves and grates assemblies therein for threshing of grain from material other than grain (MOG) and shaken main sieves assemblies for separating product grain and tailings composed primarily of MOG, the improvement comprising bonus sieves assemblies located in the outer rear of each side of the PPU for accepting the tailings from the concaves and grates assemblies and the main sieves assemblies for additional separation of grain from MOG.

2. The improved articulated harvesting combine of claim 1, wherein dedicated fan assemblies provide air volume for the grain cleaning function of the bonus sieves assemblies.

3. The improved articulated harvesting combine of claim 1, additionally comprising return elevators for each bonus sieves assembly, which return elevators accept the tailings from the main sieves, split the flow about the middle and convey it outwardly, and in turn accept the flow from each bonus sieves assembly on each respective side of the main sieves, and return such tailings to each bonus sieves assembly for further grain separation.

4. The improved articulated harvesting combine of claim 1, wherein the main sieves assemblies are carried by upper rails and the bonus sieves assemblies also are carried by the upper rails resulting in the bonus sieves assemblies also being shaken by the upper rails.

5. In a method for harvesting grain using an articulated harvesting combine of a forward power processing unit (PPU) having a forward set of wheel assemblies and a rear grain cart connected by an articulating joint assembly, where the PPU carries concaves and grates assemblies therein that thresh grain from material other than grain (MOG) and shaken main sieves assemblies for separating product grain and tailings composed primarily of MOG, the improvement comprising:

transferring the tailings from the concaves and grates assemblies and the main sieves assemblies to bonus sieves assemblies located in the outer rear of each side of the PPU for additional separation of grain from MOG.

6. The improved method of claim 5, further comprising providing air volume with dedicated fan assemblies for the grain cleaning function of the bonus sieves assemblies.

7. The improved method of claim 5, further comprising accepting the tailings from the main sieves using return elevators for each bonus sieves assembly, splitting the flow about the middle and conveying it outwardly, and in turn accepting the flow from each bonus sieves assembly on each respective side of the main sieves, and returning such tailings to each bonus sieves assembly for further grain separation.

8. The improved method of claim 5, further comprising carrying the main sieves assemblies and the bonus sieves with upper rails resulting in the bonus sieves assemblies also being shaken by the upper rails.

\* \* \* \* \*